United States Patent [19]
Brüssel

[11] Patent Number: 5,014,546
[45] Date of Patent: May 14, 1991

[54] APPARATUS FOR DETERMINING THE DISTANCE BETWEEN A PAIR OF SURFACES IN COMMUNICATION WITH UPPER AND LOWER MOLD HALVES IN A PRESS

[75] Inventor: Richard Brüssel, Sulzfeld, Fed. Rep. of Germany

[73] Assignee: Krupp Maschinentechnik Gesellschaft mit beschränkter Haftung, Essen, Fed. Rep. of Germany

[21] Appl. No.: 444,856

[22] Filed: Dec. 4, 1989

[30] Foreign Application Priority Data

Dec. 8, 1988 [DE] Fed. Rep. of Germany ....... 3841327

[51] Int. Cl.⁵ .............................................. G01B 13/12
[52] U.S. Cl. ...................................................... 73/37.5
[58] Field of Search .......................... 73/37.5, 37, 37.6

[56] References Cited
U.S. PATENT DOCUMENTS
4,076,780 2/1978 Ditto .

FOREIGN PATENT DOCUMENTS
2014071 10/1971 Fed. Rep. of Germany ....... 73/37.5
2341581 2/1975 Fed. Rep. of Germany .

Primary Examiner—Hezron E. Williams
Assistant Examiner—Joseph W. Roskos
Attorney, Agent, or Firm—Spencer & Frank

[57] ABSTRACT

In order to ensure that the pressing force exerted during the production of molded objects acts exclusively on the molding compound (34), and is not absorbed by the lands (1a, 2a) the mold halves (1, 2), a distance determining apparatus employs a nozzle (3) bored into one of the lands. The mouth of the nozzle faces the land of the other mold half. The nozzle is connected by way of a hose (5) with a pressure source (9) for a compressible flow medium, such as compressed air. The hose serves as a reservoir for the flow medium. After attaining a starting state in which a predetermined overpressure is applied to the reservoir, the pressure source is switched off by a valve (7), and the time needed for the pressure in the reservoir to drop to a predetermined lower value is measured. This time period constitutes a measure of the distance (x) between the two lands (1a, 2a) of the mold halves.

17 Claims, 2 Drawing Sheets

APPARATUS FOR DETERMINING THE DISTANCE BETWEEN A PAIR OF SURFACES IN COMMUNICATION WITH UPPER AND LOWER MOLD HALVES IN A PRESS

CROSS REFERENCE TO RELATED APPLICATION

This application claims the priority of application Ser. No. P 38 41 327.2, filed Dec. 8th, 1988 in the Federal Republic of Germany, the subject matter of which is incorporated herein by reference.

BACKGROUND OF THE INVENTION

The present invention relates to an apparatus for determining the distance between two surfaces which are in communication with upper and lower mold halves in a press, particularly mold halves for shaping fiber-reinforced molding compound, with the mold halves being adapted to one another in such a manner that they assume an end position corresponding to the desired thickness of the molded object when the space between the surfaces communicating with the mold halves has attained a limit value.

When a molded object is made by compressing fiber-reinforced molding compound, care must be taken that the pressing force acts exclusively on the molding compound. The pressing force should not be absorbed, even in part, by the lands of the mold halves. The lands are adapted with respect to their position and configuration so that the molded object to be produced has the desired thickness when there is a small predetermined distance between the lands—for example in the order of magnitude of 0.2 mm.

In the press for processing fiber-reinforced molding compound involved here, it may be difficult to conduct the distance measurement for achieving the desired thickness of the molded object. The press may easily reach temperatures up to 200° C. Furthermore soiling occurs during the molding process, so cleaning is needed from time to time. Both facts make the use of reliably operating measuring devices at least questionable.

A prior art example of the use of distance-measuring transducers during compression molding will now be discussed with reference to FIG. 2. In FIG. 2, a press 20 includes an upper platen 22 which is raised or lowered by a ram 24. A heating table 26 is affixed to a lower platen 28. An upper mold half 1 is mounted on upper platen 22 and a lower mold half 2 is mounted on heating table 26. It will be apparent that the mold halves 1 and 2 cooperate to form a mold which, in the closed position as shown, defines a mold cavity. Adjacent the mold cavity, mold half 1 is provided with lands 1a and mold half 2 is provided with lands 2a.

With continuing reference to FIG. 2, the platens 22 and 28 are rectangular, with the plains of the respective rectangles being perpendicular to the plane of the drawing. Four linear variable differential transformers (LVDTs) 30 (only two of which are shown) are mounted on lower platen 28 adjacent the corners of the rectangle to provide distance-measuring transducers. The LVDTs 30 come into contact with upper platen 22 as RAM 24 is being lowered, and during further closing movement of the mold the LVDTs 30 generate signals corresponding to the distance between platens 22 and 28 at the four corners of the rectangle. At least one hydraulic cylinder 32 is provided adjacent every LVDT 30. The hydraulic cylinders 32 selectively generate upward forces adjacent the corners of the rectangle to resist the downward force imparted by RAM 24 as the mold is closed.

During a compression molding procedure, the ram 24 is raised to open the mold. A measured charge of molding compound 34 is placed at the center of lower mold half 2. A typical molding compound would include about one third polyester resin, about one third to two thirds glass fiber, and the rest a filler such as calcium carbonate. Ram 24 is then actuated to begin closing the mold. As the mold-closing process progresses the LVDTs 30 generates signals which are supplied to an electrical controller (not illustrated). The controller selectively actuates hydraulic cylinders 32 to ensure that the mold halves 1 and 2 remain parallel and to control the relative velocity between mold halves 1 and 2. The relative velocity is reduced to zero when LVDTs 30 signal that the distance between mold halves 1 and 2 has reached th desired value, and thus that the molded object has attained the desired thickness.

Further details about press 20 and its use during a compression molding procedure can be found in U.S. Pat. No. 4,076,780, the disclosure of which is incorporated herein by reference.

SUMMARY OF THE INVENTION

It is an object of the present invention to provide an apparatus for determining the distance between two suitable surfaces at upper and lower mold halves in a press, with the apparatus being relatively immune to malfunction, being particularly insensitive to soiling and to high temperatures, and furnishing reliable measurement values without special alignment.

These and other objects which will become apparent in the ensuing detailed description can be attained by providing an apparatus for determining the distance between two surfaces which are in communication with upper and lower mold halves in a press, the apparatus being characterized in that one of the two surfaces is equipped with a nozzle oriented toward the other of the surfaces, with the nozzle being connected by way of a reservoir to a pressure controlled pressure source for a compressible flow medium, and in that a control unit is provided which measures the period of time, beginning at the moment the pressure source is switched off during which the pressure present in the reservoir at the moment of switching drops to a predetermined lower value. The apparatus is particularly useful for determining the distance between surfaces which are in communication with mold halves that are used with fiber-reinforced molding compound, with the mold halves being adapted to one another in such a way that they assume an end position corresponding to the desired thickness of the molded object when the distance between the surfaces has reached a limit value.

A basic idea of the invention is that a nozzle disposed in one of the two adjacent surfaces is connected by way of a reservoir to a pressure source for a compressible flow medium (particularly air or an inert gas). A certain predetermined pressure is applied to the reservoir and, once the pressure source has been shut off, the period of time for the pressure applied to the reservoir to drop a predetermined lower value is measured. This period of time is a measure of the distance between the two surfaces associated with the mold halves.

In order to produce accurate measuring results, the nozzle should preferably be designed so that it has a considerably lower choke resistance than the gap between the adjacent surfaces.

If air is used as the compressible flow medium, a nozzle having a nozzle bore on the order of magnitude of 3 mm may be used to determine distances of not more than 0.5 mm between the two surfaces.

To obtain proper measuring results, the apparatus of the invention should be equipped to perform time measurements as mentioned above under conditions that are as identical and reproducible as possible. This requires, inter alia, that a time measurement begin only when a quasi stationary state has developed in the reservoir connected to the pressure source, a state in which the pressure in the reservoir has a corresponding elevated value.

In an advantageous embodiment of the present invention, a control unit for determining the time it takes for the pressure drop is equipped with a pressure sensor which is connected in parallel with the reservoir. The pressure source is preferably connected to the reservoir by way of a check valve, which can be switched to a closed or blocking position when a predetermined over-pressure exists in the reservoir.

For this purpose, the control unit may be equipped with an optical display which indicates the pressure in the reservoir, so that the check valve can be manually actuated to turn off the pressure source when a predetermined over-pressure is reached. However, it is also possible to link the control unit and the check value in such a way that the check valve is moved into the blocking position by remote control as soon as the pressure sensor of the control unit has detected the predetermined overpressure value in the reservoir.

Preferably, the reservoir has its exit end fastened laterally to the body supporting the surface associated with the upper mold half. The reservoir itself may be formed simply by a hose, particularly a hose made of a suitably resistant plastic (preferably polytetrafluoroethylene, or PTFE). Due to the lateral arrangement of the reservoir, the valving and control components of the measuring apparatus can be arranged outside of the high temperature region and outside of the region subject to soiling. Since a nozzle having an easily manufactured bore is arranged only in one of the bodies having the opposing surfaces, no alignment problems occur even if the thickness of the respective body changes, for example, due to grinding.

Because of the use of a hose as the reservoir, the already-mentioned sensitive components can be mounted stationarily (and thus inexpensively and less subject to malfunction), for example to the press stand.

DESCRIPTION OF THE PREFERRED EMBODIMENT

Figure 1:
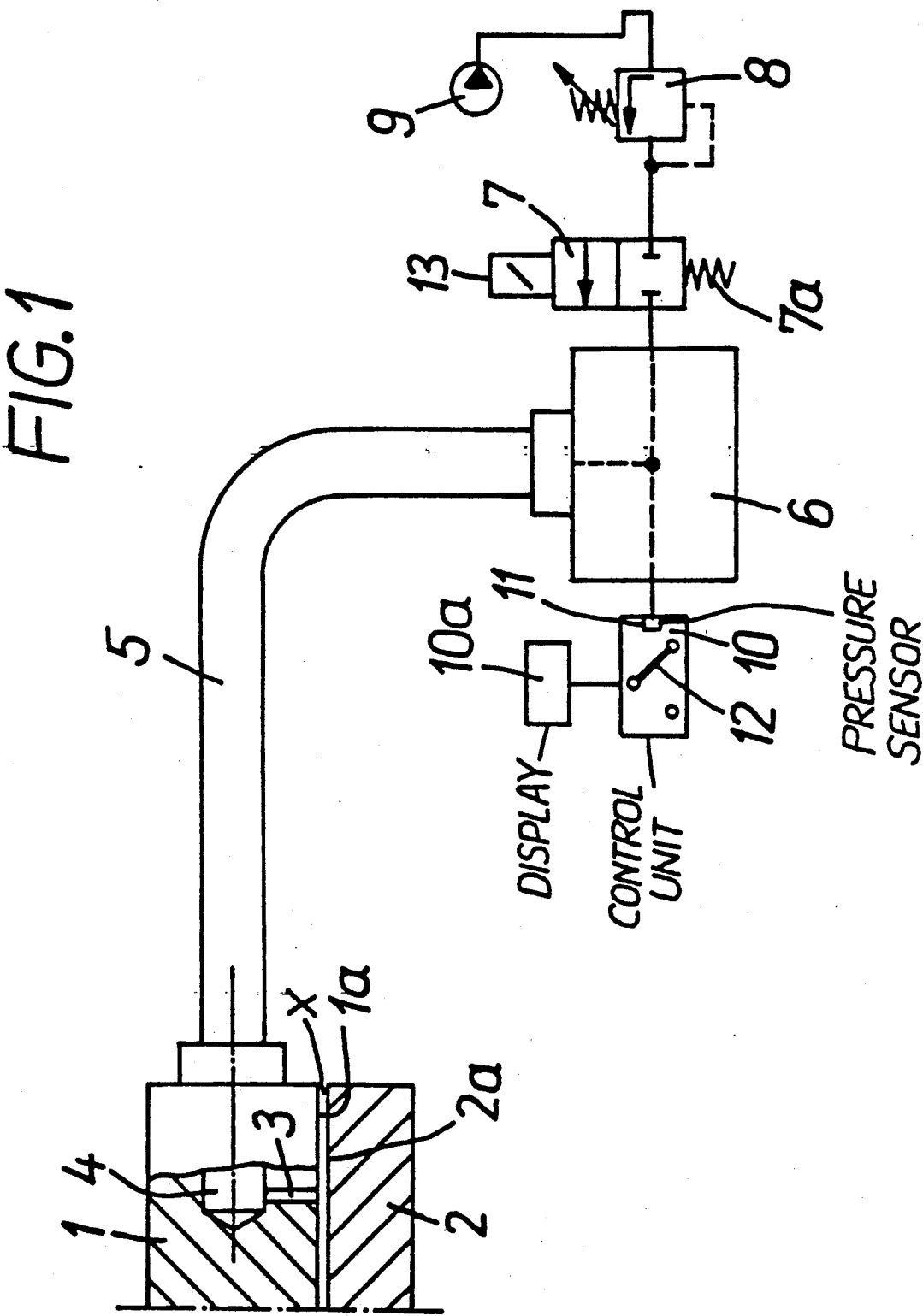
FIG. 1 schematically illustrates an apparatus according to the invention for determining the distance between a land of an upper mold portion and a land of a lower mold portion.
Figure 2:
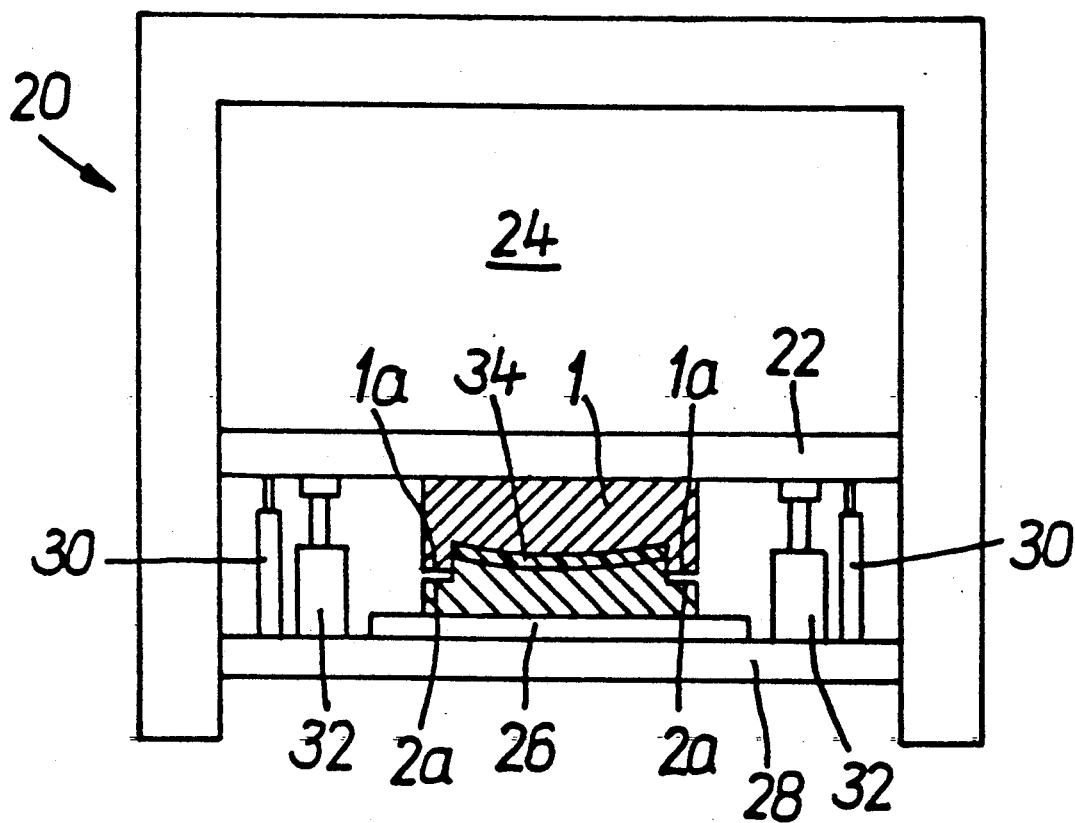
FIG. 2 is a front view, partially in section, illustrating a press with mold halves and transducers in accordance with a prior art compression molding technique.

FIG. 1 schematically illustrates an example of an apparatus in accordance with the present invention for determining the distance between two surfaces which are respectively in communication with the upper and lower halves of a mold. In this example the surfaces are the land 1a of an upper mold half 1 and the land 2a of a lower mold half 2. Only the lands 1a and 2a are illustrated in FIG. 1. It will be understood that the mold halves 1 and 2 are configured to provide a mold cavity having the desired configuration, and are used in a press such as, for example, the press 20 illustrated in FIG. 2.

In order to determine the distance x between mutually facing lands 1a and 2a, the upper land 1a is equipped with a nozzle 3 in the form of a bore oriented perpendicularly to lands 1a and 2a.

Moreover, the upper mold half 1, on its outwardly oriented side, is provided with a connecting bore 4. The bore 4 communicates, via a plastic hose 5, a connecting member 6, a check valve 7, and a pressure control valve 8, with a pressure source 9. Pressure source 9 may be a compressed air pump. Check valve 7 includes a closing spring 7a which normally causes check valve 7 to assume a closed or blocking position, as illustrated. In the closed position, the supply of compressed air to hose 5 is interrupted. Hose 5 serves as a reservoir for compressed air.

Connecting member 6 is also in communication with a pressure sensor 11 of a control unit 10, which is connected to a display device 10a.

The principle of operation of the apparatus will now be discussed. When the supply of compressed air from pressure source 9 is interrupted by closing check valve 7, the period of time within which the pressure present in hose 5 at the moment pressure source 9 is shut off (the so-called overpressure) drops to a predetermined lower value is measured. The measured time period is a function of the distance x between faces 1a and 2a.

The measured time period may be shown on display 10a, in which case a graph (not shown) of elapsed time versus distance can be employed to determine the distance x. Such a graph can be experimentally derived by varying the distance between lands 1a and 1b in increments, by charging the hose 5 with compressed air during each increment until the predetermined overpressure is reached, and by measuring the time it takes for the pressure in hose 5 to fall to the predetermined lower value. This time will depend not only upon the distance between lands 1a and 1b but also upon various factors, such as the diameter of nozzle 3, which do not vary as the distance changes. Instead of showing the measured time period on display 10a and using an experimentally derived graph to find the distance x, one can of course convert the measured time period electronically (using, for example, a microcomputer or a table look-up ROM, not shown) and show the distance x itself on display 10a.

To ensure that the distance measurement is performed under coinciding, reproducible conditions, hose 5 is connected to pressure source 9 until a quasi-stationary state with the associated overpressure value has developed. Only then does the time measurement (which is performed as soon as check valve 7 is closed) start. During this measurement period, the pressure within the reservoir (i.e., hose 5) drops more or less quickly depending on the magnitude of the distance x between lands 1a and 2a.

In view of the above discussion of the principal of operation of the apparatus, it will be apparent that there are several alternatives for the construction of control unit 10. The simplest alternative is that of manual operation. With reference to FIG. 1, an operator manually places a switch 12 on control unit 10 in a first position, thereby providing an amplified signal from pressure sensor 11 to display 10a. Assuming that display 10a is a digital rather than an analog device, the amplified signal is converted to digital form by an analog-to-digital converter (not shown) within control unit 10 before reaching display 10a. The operator then presses a button 13 on check valve 7 and watches display 10a as the pressure rises to a predetermined overpressure value. When the overpressure value is reached the operator immediately releases button 13, thereby disconnecting hose 5 from the pressure source 9, and places switch 12 in a second position. In this second position of switch 12, a comparator (not illustrated) within control unit 10 compares the output from pressure sensor 11 with a reference voltage, corresponding to the predetermined lower value of the pressure. A digital counter (not illustrated) within control unit 10 begins counting pulses from a clock (not illustrated) when switch 12 is moved to the second position, and stops counting the clock pulses when the comparator signals that the output signal from pressure sensor 11 is equal to the reference value. The content of the counter may then be shown on display 10a as a measure of the elapsed time.

As another alternative, control unit 10 could be designed to permit automatic operation of the distance-determining apparatus, possibly under the control of a microcomputer (not illustrated) in the control unit 10. For example, pushbutton 13 could be replaced by a solenoid (not illustrated) for actuation of check valve 12, and switch 12 could be replaced by a simple pushbutton switch which the operator presses when he actuates the press to bring the mold halves 1 and 2 together. Control unit 10 would then energize the solenoid to open check valve 7, and the resulting rise of pressure in hose 5 would be detected by pressure sensor 11. Instead of showing the pressure on display 10a, control unit 10 would compare the output signal from sensor 11 to a reference value corresponding to the predetermined overpressure. Control unit 10 would then de-energize the solenoid to open valve 7 and begin measuring how long it takes for the pressure in hose 5 to fall to the predetermined lower value, in a manner similar to that previously discussed with respect to the manual operation alternative. When the distance between lands 1a and 2a is relatively large the pressure in hose 5 will fall off relatively rapidly, thereby leading to an indeterminate result for the distance measurement. In this case the distance x would not be shown on display 10a after the pressure in hose 5 has reached the predetermined lower limit. Instead, after a brief delay control unit 10 would energize the solenoid again to begin another measuring cycle. As the distance between lands 1 and 2 narrows the results of each cycle become increasingly accurate and are shown on display 10a so that the operator can stop the press when the desired value for the separation between lands 1 and 2 has been reached. Alternatively, control unit 10 itself could emit a signal for halting the press when the desired value of x has been attained.

In the foregoing examples the hose 5 has been charged with compressed air until a predetermined overpressure is reached, and the distance x is determined as a function of how long it takes the pressure in hose 5 to thereafter fall to a predetermined lower limit. It will be apparent to those skilled in the art that x might alternately be determined as a function of how far the pressure in hose 5 falls during a predetermined time interval after hose 5 has been charged. Furthermore, instead of charging hose 5 to the overpressure value and then detecting a pressure drop, the distance x could be determined as a function of the pressure rise as compressed air is introduced into hose 5 after check valve 7 is opened.

The present invention may be employed as a monitoring apparatus to the extent that, at the end of a pressing process, a check is made in the manner described above to determine whether the surfaces in question (e.g., lands 1a and 2a) are disposed away from one another at that time. The apparatus can thus ensure that the pressing force acts only on the molding compound that is being processed.

It will be understood that the above description of the present invention is susceptible to various modifications, changes, and adaptations, and the same are intended to be comprehended within the meaning and range of equivalents of the appended claims.

What is claimed is:

1. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means form the pressure source when the isolating means is in the closed position; and control means for measuring the pressure change in the reservoir means after the position of the isolating means has been changed, wherein the control means includes a pressure sensor communicating with the compressible flow medium in the reservoir means.

2. The apparatus of claim 1, wherein the reservoir means comprises a hose.

3. The apparatus of claim 1, wherein the mold halves mold the object from fiber-reinforced molding compound.

4. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means from the pressure source when the isolating means is in the closed position; and control means for measuring the pressure change in the reservoir means after the position of the isolating means has been changed, wherein the isolating means includes a check valve which is moved from the open position to the closed position when a predetermined overpressure value is sensed in the reservoir means.

5. The apparatus of claim 4, wherein the reservoir means comprises a hose.

6. The apparatus of claim 4, wherein the mold halves mold the object from fiber-reinforced molding compound.

7. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means from the pressure source when the isolating means is in the closed position; and control means for measuring the pressure change in the reservoir means after the position of the isolating means has been changed, wherein the first mold half is an upper mold half having a land, wherein the first surface is the land of the upper mold half, wherein the reservoir means has a discharge end, and wherein the discharge end of the reservoir means is fastened laterally to the upper mold half.

8. The apparatus of claim 7, wherein the reservoir means comprises a hose.

9. The apparatus of claim 7, wherein the mold halves mold the object from fiber-reinforced molding compound.

10. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means from the pressure source when the isolating means is in the closed position; and control means for measuring the pressure change in the reservoir means after the position of the isolating means has been changed, wherein the conveying means further includes means for controlling the pressure of the compressible flow medium from the pressure source.

11. The apparatus of claim 10, wherein the reservoir means comprises a hose.

12. The apparatus of claim 10, wherein the mold halves mold the object from fiber-reinforced molding compound.

13. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means from the pressure source when the isolating means is in the closed position; and control means for measuring the pressure change in the reservoir means after the position of the isolating means has been changed, wherein the control means includes means for measuring the period of time, beginning at the moment the isolating means is moved from the open position to the closed position, during which the pressure in the reservoir means at the moment the isolating means is moved from the open position to the closed position falls to a predetermined lower value.

14. The apparatus of claim 13, wherein the reservoir means comprises a hose.

15. The apparatus of claim 13, wherein the mold halves mold the object from fiber-reinforced molding compound.

16. An apparatus for determining the distance between first and second surfaces as an object is being molded by first and second mold halves mounted in a press, the first surface having a fixed position with respect to the first mold half and the second surface having a fixed position with respect to the second mold half, the press moving at least one of the mold halves so that the relative position of the mold halves assumes an end value corresponding to the desired thickness of the molded object when the distance between the first and second mold halves has reached a predetermined limit value, said apparatus comprising:

nozzle means, on one of the first and second surfaces, for providing a nozzle oriented toward the other of the first and second surfaces;

a pressure source for a compressible flow medium;

conveying means for conveying the compressible flow medium from the pressure source to the nozzle means, the conveying means including reservoir means for providing a reservoir for the compressible flow medium, and isolating means, selectively movable between an open position and a closed position, for isolating the reservoir means from the pressure source when the isolating means is in the closed position; and control means for measuring the pressure change in the reservoir means after the position of the isolating means has been changed, wherein the mold halves mold the object from fiber-reinforced molding compound.

17. The apparatus of claim 16, wherein the reservoir means comprises a hose.

* * * * *